(Model.)

E. A. REED.
MACHINE FOR CUTTING EAR CORN.

No. 308,629. Patented Dec. 2, 1884.

WITNESSES

INVENTOR
EDWARD A. REED
BY
ATTORNEYS.

UNITED STATES PATENT OFFICE.

EDWARD A. REED, OF LAMOILLE, ILLINOIS.

MACHINE FOR CUTTING EAR CORN.

SPECIFICATION forming part of Letters Patent No. 308,629, dated December 2, 1884.

Application filed June 13, 1883. (Model.)

*To all whom it may concern:*

Be it known that I, EDWARD A. REED, a citizen of the United States, residing at Lamoille, in the county of Bureau and State of Illinois, have invented certain new and useful Improvements in Machines for Cutting Ear Corn, which are fully set forth in the following specification, reference being had to the accompanying drawings, in which—

Figure 1:
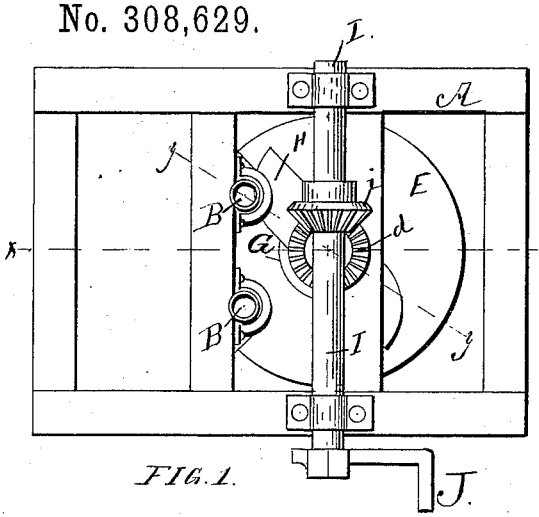
Figure 2:
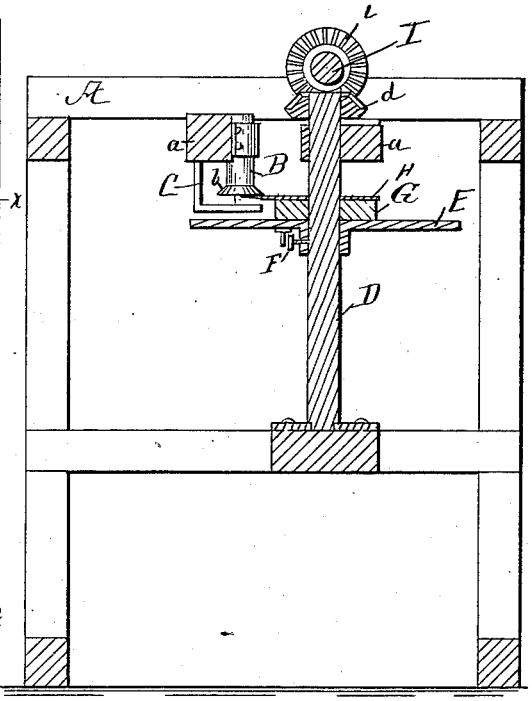
Figure 3:
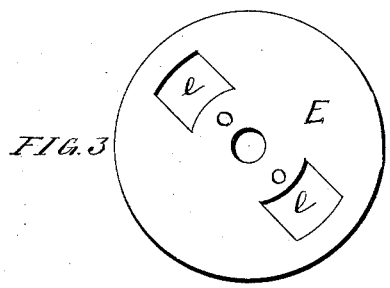
Figure 5:
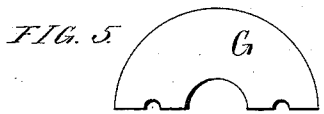
Figure 4:
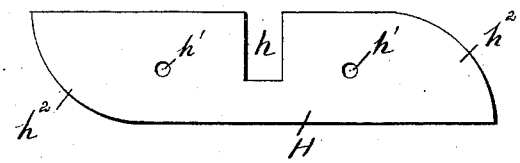
Figure 6:
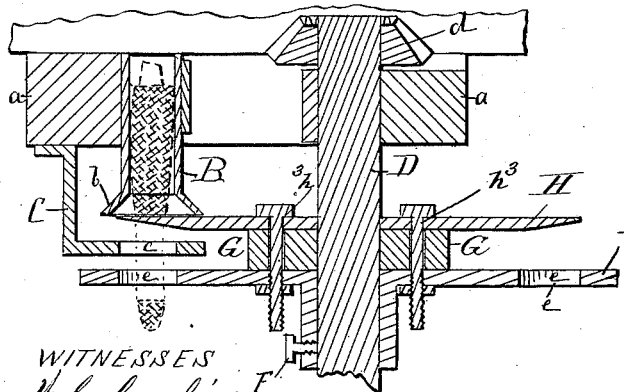
Figure 7:
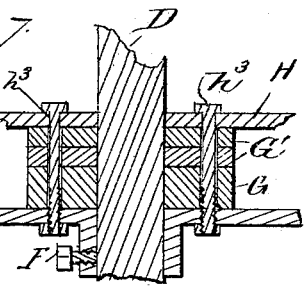

Figure 1 represents a plan view of a machine embodying my improvements. Fig. 2 is a vertical section of the same, taken on the line $x\ x$, Fig. 1; Fig. 3, a detail plan of the rotating disk on the same shaft as the cutter; Fig. 4, a similar view of the cutter or knife; Fig. 5, a similar view of a portion of the collar between the disk and the knife; Fig. 6, a detail section, on an enlarged scale, taken on the line $y\ y$, Fig. 1; and Fig. 7, a detail section showing the means of regulating the distance between the knife and disk by using more than one collar.

My invention relates to a machine for chopping or cutting up ears of corn crosswise.

The invention consists in devices and combinations of devices for accomplishing the result mentioned above.

I will proceed to describe in detail the construction and operation of a machine embodying my improvements in which I have carried out my invention practically in one way, and will then point out definitely in the claims the special improvements which I believe to be new and wish to protect by Letters Patent.

In the drawings, A represents the supporting-frame of the machine, and $a\ a$ two cross-beams arranged just underneath the main cross-beams at the upper end of the frame. One or more tubes, B, are mounted on one of these cross-beams $a$, the size of the tubes being sufficient to receive ears of corn introduced lengthwise. These tubes are preferably arranged in a vertical position; but they may be inclined even at an angle of forty-five degrees, if desired. At their lower ends they are provided with a slightly flaring or funnel-shaped section, $b$, as shown in the drawings. Brackets C are attached to the under side of the same cross-beam $a$, their free ends being bent downward and carried directly underneath the respective lower ends of the tubes, and provided with openings $c$ directly underneath the tube-openings, as shown in Fig. 6 of the drawings. It will be seen of course that there is an open space between the openings or inner ring portion of these brackets and the lower ends of the tubes. These tubes may be called "feed-tubes." A shaft, D, is mounted vertically in suitable journal-bearings on the supporting-frame, being provided at its upper end with a bevel-gear, $d$. A circular disk or plate, E, is fixed to this shaft and attached thereto by means which enable it to be adjusted up and down upon the shaft. A set screw, F, is inserted to secure the disk to the shaft and at the same time permit it to be adjusted thereon. This disk or plate is of sufficient size to extend out underneath the perforated or ring portion of the brackets. The vertical adjustment mentioned permits the space between the disk and the ends of the brackets to be regulated at will. The disk is provided with one or more openings, $e$, which are so arranged that as the disk is rotated they will be brought successively directly underneath the openings of the brackets heretofore mentioned. The circular collar G is attached to the upper side of the disk and surrounds the shaft, and to the upper side of this collar the cutter or knife H is secured in any suitable way. As shown in the drawings, this cutter is provided with a side notch, $h$, which receives the shaft, and is fastened to the collar by screws $h^3$ through the openings $h'$. The cutter is of sufficient length to project out on each side of the collar, and is provided with a cutting-edge, $h^2$, at each end on opposite sides. The collar must be set so as to bring the knife above the ring portion of the brackets, so that its cutting-edges will pass between the upper faces of the horizontal portions of the brackets and the lower ends of the feed-tubes.

As described above, the disk and knife are arranged horizontally; but they may be arranged at an angle of forty-five degrees, if desired, by mounting them in an inclined position on the shaft or by inclining the shaft itself. A horizontal shaft, I, is mounted in suitable bearings on the upper part of the frame, and is provided with a bevel-gear, $i$, fixed thereon and arranged to engage with the bevel-gear on the upright shaft. The horizontal shaft may be provided with a crank, J, at one end, or any other device by means of which power may be applied to the shaft. Obviously the rotation of the horizontal shaft will also rotate the upright shaft and with it the disk and the collar and the cutter attached thereto. The ears of corn are fed in lengthwise to the tubes, as shown in Fig. 6 of the drawings. The lower end of the ear will obviously pass downward through the ring of the bracket and rest upon the disk, in which position it will be supported, so that when the cutting-edge of the knife is brought against it by the rotation of the shaft the knife will cut the corn between the bracket and the lower end of the feed-tube. If the openings in the disk are arranged directly underneath the ends of the knife, which is the preferable arrangement, the corn will fall through the disk at once. The arrangement may be such that it will be held up until the opening in the disk is brought underneath, when it will fall through to a receptacle below. In this way by rotating the upright shaft the ears of corn may be successively chopped up, and no great power is required to be applied to the horizontal shaft for the purpose of rotating the cutter-shaft. The vertical adjustment of the disk provides for suitable arrangement to give the lower end of the ear proper support, while the thickness of the sections into which the ears are cut will be determined by the distance between the knife and he disk. This distance may be regulated by any suitable device. I have shown one way of effecting it in Fig. 7 of the drawings, in which additional collars, G', are put between the knife and the disk, thereby increasing the distance of separation and accordingly the thickness of the sections into which the ears of corn will be cut. A suitable hopper may be mounted on the upper portion of the frame with openings into the feed-tube, so that the feeding of the ears of corn into the machine will be automatically accomplished. This device will be readily understood, and I have not deemed it necessary to show it in the drawings. The inclination of either the feed-tubes or the knife permits, within certain limits, an adjustment of the parts used so as to sever the ears of corn at an angle to their axes, instead of perpendicular thereto, as in the arrangement described above and shown in the drawings.

I do not limit myself to the exact devices herein described or to the construction and arrangement of the said devices, for in many respects they may be changed but yet operate upon the same general principle and accomplish the same general result as herein set forth and described.

Having thus described my invention, what I claim as new, and wish to protect by Letters Patent, is—

1. The feed-tubes, in combination with the perforated brackets and plate to sustain the ends of the ears of corn, substantially as and for the purposes set forth.

2. The feed-tubes, in combination with the perforated brackets, the perforated stop-plate, and the knife for severing the ears between the feed-tubes and the brackets, substantially as described.

3. The feed-tubes, in combination with the perforated brackets, revolving disk provided with openings, and a revolving cutter for severing the ears, substantially as and for the purposes set forth.

4. The perforated brackets, in combination with the disk adjustable on its shaft, substantially as and for the purposes set forth.

5. The feed-tubes, in combination with the perforated brackets, the perforated disk, the cutter attached to the same shaft, and mechanism to regulate the distance between it and the disk, substantially as and for the purposes set forth.

EDWARD A. REED.

Witnesses:
J. L. REMSBURG,
J. J. HOPKINS.